United States Patent
Nunokawa et al.

(10) Patent No.: US 9,504,136 B2
(45) Date of Patent: Nov. 22, 2016

(54) INVERTER DEVICE, PLASMA GENERATING DEVICE, SHEET-MEMBER REFORMING DEVICE, AND ALTERNATING-CURRENT VOLTAGE OUTPUT METHOD

(71) Applicants: Atsushi Nunokawa, Kanagawa (JP); Hisahiro Kamata, Kanagawa (JP)

(72) Inventors: Atsushi Nunokawa, Kanagawa (JP); Hisahiro Kamata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/597,731

(22) Filed: Jan. 15, 2015

(65) Prior Publication Data
US 2015/0200606 A1    Jul. 16, 2015

(30) Foreign Application Priority Data
Jan. 16, 2014  (JP) .................. 2014-005617

(51) Int. Cl.
| | |
|---|---|
| H02M 7/493 | (2007.01) |
| H05H 1/24 | (2006.01) |
| H05B 33/08 | (2006.01) |
| H02M 7/537 | (2006.01) |
| H02M 7/48 | (2007.01) |
| H05H 1/46 | (2006.01) |
| H02M 1/00 | (2006.01) |

(52) U.S. Cl.
CPC .......... *H05H 1/2406* (2013.01); *H02M 7/537* (2013.01); *H05B 33/0815* (2013.01); *H02M 2001/008* (2013.01); *H02M 2007/4815* (2013.01); *H05H 2001/2412* (2013.01); *H05H 2001/4682* (2013.01); *Y02B 70/1441* (2013.01)

(58) Field of Classification Search
None
See application file for complete search history.

(56) References Cited

U.S. PATENT DOCUMENTS

| | | | | |
|---|---|---|---|---|
| 5,177,675 A | * | 1/1993 | Archer ............... | H02M 3/3372 363/134 |
| 7,365,501 B2 | * | 4/2008 | Ushijima .............. | H01J 61/56 315/278 |
| 7,463,500 B2 | * | 12/2008 | West ...................... | H02M 7/48 307/45 |

(Continued)

FOREIGN PATENT DOCUMENTS

| | | |
|---|---|---|
| JP | 3144323 | 1/2001 |
| JP | 2004-328951 | 11/2004 |

(Continued)

*Primary Examiner* — Crystal L Hammond
(74) *Attorney, Agent, or Firm* — Duft Bornsen & Fettig LLP (57) ABSTRACT

An inverter device includes: multiple inverters that switch input voltages by turning on and off respective switching elements to thereby apply excitation currents to primary excitation windings of respective boosting transformers and output alternating-current voltages from secondary output windings of the respective boosting transformers, the multiple inverters having the same output characteristics, and a common control circuit, on/off control of the switching elements of the inverters being performed by the same switching signal output from the common control circuit.

7 Claims, 8 Drawing Sheets

(56) References Cited

U.S. PATENT DOCUMENTS

| | | | | |
|---|---|---|---|---|
| 8,884,644 B1* | 11/2014 | Ben Artsi | ............... | H01P 3/026 |
| | | | | 326/30 |
| 9,390,848 B2* | 7/2016 | Ouyang | ................. | H02M 1/10 |
| 2005/0109749 A1* | 5/2005 | Karino | ................... | B23K 9/092 |
| | | | | 219/130.5 |
| 2008/0042587 A1* | 2/2008 | Miyazaki | ............. | H05B 41/282 |
| | | | | 315/210 |
| 2009/0154202 A1* | 6/2009 | Takatsuka | .......... | H05B 41/2828 |
| | | | | 363/40 |
| 2009/0251055 A1* | 10/2009 | Kimura | ............... | H02M 3/3378 |
| | | | | 315/119 |
| 2009/0296438 A1* | 12/2009 | Boeke | .................... | H02M 7/48 |
| | | | | 363/101 |
| 2011/0235382 A1 | 9/2011 | Kamata | | |
| 2012/0163058 A1 | 6/2012 | Kamata | | |
| 2012/0236614 A1 | 9/2012 | Kamata | | |
| 2014/0078212 A1 | 3/2014 | Nakai et al. | | |
| 2014/0268966 A1 | 9/2014 | Kamata | | |

FOREIGN PATENT DOCUMENTS

| | | |
|---|---|---|
| JP | 2005-151048 | 6/2005 |
| JP | 2011-057442 | 3/2011 |
| JP | 2012-186984 | 9/2012 |
| JP | 5196372 | 2/2013 |

* cited by examiner

Δt: AMOUNT OF TIME LAG
ΔV: POTENTIAL DIFFERENCE BETWEEN ELECTRODES

FIG.11

Δt: AMOUNT OF TIME LAG
ΔV: POTENTIAL DIFFERENCE BETWEEN ELECTRODES

FIG.12

ΔV: POTENTIAL DIFFERENCE BETWEEN ELECTRODES

INVERTER DEVICE, PLASMA GENERATING DEVICE, SHEET-MEMBER REFORMING DEVICE, AND ALTERNATING-CURRENT VOLTAGE OUTPUT METHOD

CROSS-REFERENCE TO RELATED APPLICATIONS

The present application claims priority to and incorporates by reference the entire contents of Japanese Patent Application No. 2014-005617 filed in Japan on Jan. 16, 2014.

BACKGROUND OF THE INVENTION

1. Field of the Invention

The present invention relates to an inverter device, a plasma generating device which uses the inverter device as a power source, a sheet-member reforming device using the plasma generating device, and an alternating-current voltage output method.

2. Description of the Related Art

A switching regulator or an inverter device is used to supply high voltage to various devices, such as a discharge tube for large plasma display and a plasma generating device.

In general, a switching regulator or an inverter device with the output power value of about a few watts is commonly used; however, in a plasma generating device or the like, an inverter device with the output voltage (effective value) of a dozen kilovolts and alternating-current (AC) output power value of tens of watts or higher is used.

It is said that as a plasma discharge, for example, an atmospheric-pressure plasma discharge is generally generated by the application of a high voltage of six kilovolts or higher under an ordinary pressure condition. As a means of realizing the atmospheric-pressure plasma discharge, there are a dielectric-barrier discharge, a silent discharge, and a corona discharge in the atmosphere, etc.

For example, to perform a surface reforming process for reforming the surface of a sheet member such as a printing sheet, an atmospheric-pressure plasma generating device is used, and an inverter device which generates AC high voltage is used as a power source of the atmospheric-pressure plasma generating device.

Figure 8:
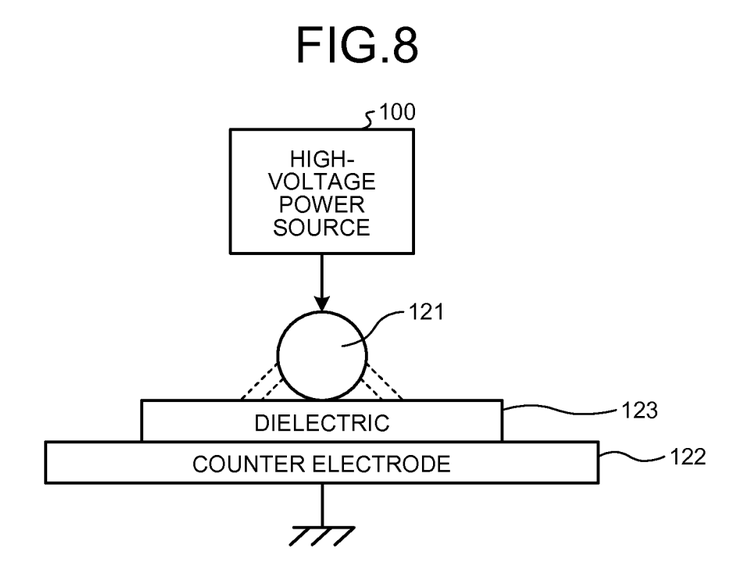
FIG. 8 is a schematic configuration diagram for explaining an example of a conventional plasma generating device.

Japanese Laid-open Patent Publication No. 2011-57442 has proposed a reforming device for reforming such a sheet member. A plasma generating device in the reforming device includes a discharge unit in which a round bar-like discharge electrode 121, which extends in a direction perpendicular to the plane of paper, and a flat plate-like counter electrode 122 are opposed across a dielectric (an insulator) 123 as shown in FIG. 8. The counter electrode 122 is grounded.

AC high voltage output from a high-voltage power source 100 is applied between the discharge electrode 121 and the counter electrode 122, thereby an atmospheric-pressure plasma discharge (such as a dielectric-barrier discharge by a creeping discharge) indicated by dashed lines is generated, and plasma is formed.

The contact area of this plasma formed by the creeping discharge with a processed surface of a sheet member (not shown) when the sheet member is conveyed along the surface of the dielectric 123 is large; therefore, the occurrence of irregularity in reforming is suppressed, and reforming uniformity is ensured with high accuracy. In general, an inverter device is used in the high-voltage power source 100.

Such a surface reforming device is applied in various fields; as an example, the surface reforming device is used in a pre-processing system of a printer. By performing a surface reforming process on a printing sheet before an image is printed on the printing sheet, adhesion and permeability of ink to the printing sheet can be controlled, and therefore color development of ink can be improved. Consequently, it is possible to expect effect of reduction in amount of ink used.

The surface reforming process on a sheet has to be performed immediately before printing, and has to be incorporated into the flow of a printing operation. Therefore, depending on the productivity of the printer, i.e., conditions of printing speed and printing sheet size, etc., the plasma generating device is required to have very high surface reforming ability.

There are several means for obtaining high processing capacity; however, to improve the processing effect by increasing the time and number of times of surface processing through discharge, the effective way is to increase the area of discharge from the plasma generating device. However, increasing the discharge area causes an increase in load; therefore, it is necessary to increase the output from an inverter device which applies high voltage between electrodes.

To obtain high-voltage high output stably by means of an inverter device, boosting by a large transformer or the like is needed.

For this purpose, if the turns ratio between excitation winding and output winding of a transformer composing an inverter device is increased, there occur problems such as an increase in loss due to increase in winding resistance or line capacity, a limitation on an available frequency band, magnetic saturation of the core, and heat generation of the core and windings.

To cope with such problems, Japanese Laid-open Patent Publication No. 2012-186984 has proposed an inverter device composed of multiple transformers having the same characteristics, wherein an excitation current is applied to respective excitation windings of the transformers to excite the excitation windings, and respective output windings are connected in series or in parallel with one another, thereby obtaining a higher-power AC output than a conventional inverter device.

However, to increase the area of discharge from a plasma generating device, it is necessary to increase the area of a counter electrode and install a plurality of discharge electrodes opposed to the counter electrode.

Figure 10:
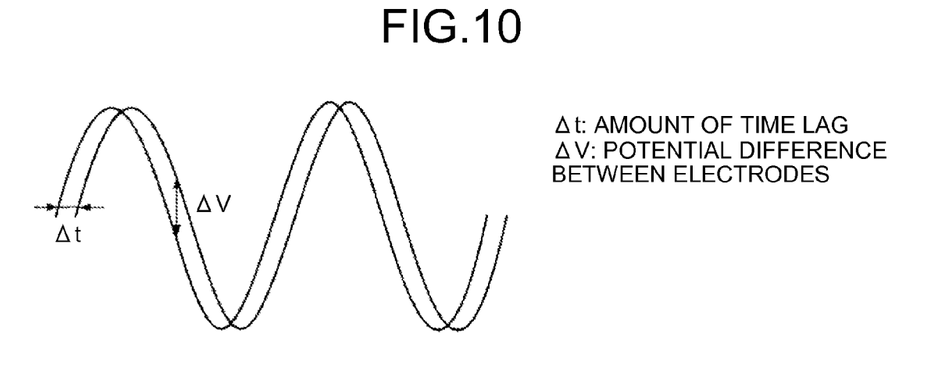
FIG. 10 is a voltage waveform diagram for explaining a potential difference between discharge electrodes that occurs when the distances from an output terminal of an inverter device differ according to the positions of the discharge electrodes.

With the increase in number of discharge electrodes, if voltage is applied to the discharge electrodes by a single inverter device, the distance from an output terminal of the inverter device varies according to the position of the discharge electrodes. That is, with increasing distance of a power supply path from the output terminal of the inverter device, an inductance component generated in the power supply path increases, and, as shown in FIG. 10, a time lag Δt due to phase delay occurs in a voltage waveform. This causes a potential difference ΔV between discharge electrodes applied with the voltage, and therefore, unnecessary discharge may be generated between the discharge electrodes.

Figure 9:
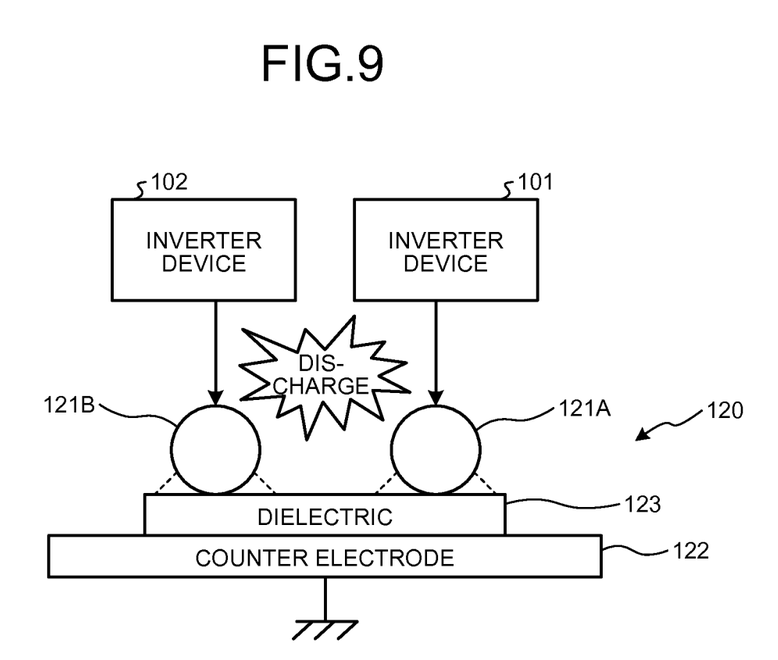
FIG. 9 is a schematic configuration diagram showing an example where multiple inverter devices are arranged and apply voltage to respective multiple discharge electrodes of a plasma generating device.

Accordingly, as a means for increasing output, as shown in FIG. 9, multiple (in FIG. 9, two) inverter devices 101 and 102 can be arranged side by side and separately apply output voltage to respective multiple discharge electrodes 121A and 121B composing a discharge unit 120 of a plasma generating device. A counter electrode 122 and a dielectric (an insulator) 123 are the same as those shown in FIG. 8.

This enables respective distances of power supply paths from output terminals of the inverter devices 101 and 102 to the discharge electrodes 121A and 121B to be about the same, i.e., can ensure that almost there is almost no difference in distance.

Figure 11:
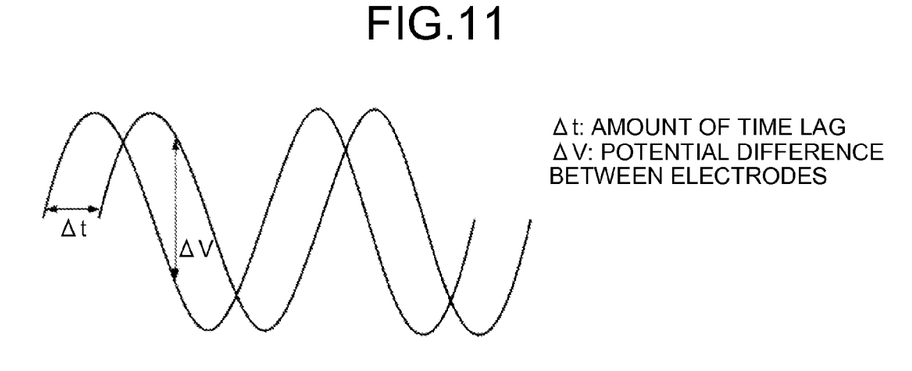
FIG. 11 is a voltage waveform diagram for explaining a potential difference generated between discharge electrodes to which output voltages from respective two inverter devices are applied, when the two inverter devices are operated independently.

However, when the side-by-side inverter devices 101 and 102 are operated independently, respective output voltages are out of phase as shown in FIG. 11; therefore, a difference in instantaneous value is caused by a time lag Δt between output voltage waveforms of the inverter devices 101 and 102. When this has caused a large potential difference ΔV between the discharge electrodes 121A and 121B, a discharge is generated between the discharge electrodes, and this may cause damage to the discharge electrodes and an increase in power loss.

Actual output voltage waveforms of the inverter devices 101 and 102 are not sinusoidal; however, for the sake of simplification of concepts, output voltage waveforms of the inverter devices 101 and 102 are shown as a sinusoidal waveform in FIGS. 10 and 11, where time is plotted on the horizontal axis and voltage is plotted on the vertical axis.

When there is a phase shift in a direction of time between the two voltage waveforms, a potential difference ΔV is generated according to a shift amount Δt of the phase shift. In the worst case, when the two voltage waveforms are shifted in phase by τ (180 degrees), the polarities of peaks of the two voltage waveforms are opposite to each other, thereby about a potential difference corresponding to the double of sine-wave amplitude is generated.

If there is a similar shift between output voltages of two inverter devices with the output voltage of tens of kilovolts, a potential difference between output voltages of the two inverter devices is tens of kilovolts at most.

Therefore, unnecessary discharge unrelated to plasma generation for surface reforming, which is the original purpose, may be generated between the discharge electrodes. The discharge generated between the discharge electrodes at this time may become an arc discharge which is different from a dielectric-barrier discharge that generates plasma, and this may incur a risk such as damage to an electrode in addition to power loss due to the discharge.

Figure 12:
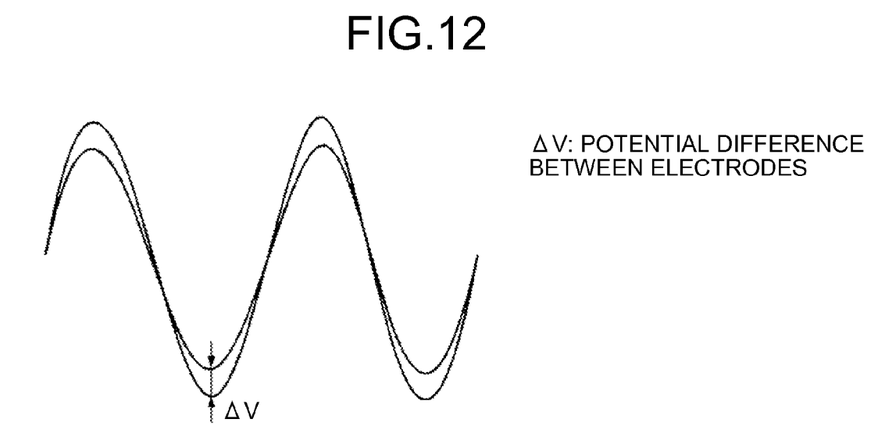
FIG. 12 is a voltage waveform diagram for explaining a potential difference generated between discharge electrodes to which output voltages from respective two inverter devices are applied, when the two inverter devices differ in output characteristics and an output value.

Furthermore, even when there is no shift (phase shift) in the direction of time between output voltage waveforms of two inverter devices, if there is a difference in output value due to a difference in output characteristics of the inverter devices, as a matter of course, a potential difference as indicated by ΔV in FIG. 12 is generated between the discharge electrodes.

In this way, when there is a potential difference between the discharge electrodes, it is necessary to increase the distance between the discharge electrodes to suppress discharge therebetween; however, this causes a problem of an increase in size of the entire device.

Moreover, if multiple discharge electrodes are kept at a distance, a discharge unit extends over a wide range, and therefore, the area where a noise source and a risk due to an unexpected discharge are to be controlled is expanded.

In view of the above, there is a need to enable an inverter device used in a plasma generating device or the like to apply necessary high voltage to multiple discharge electrodes which are loads without generating an unnecessary discharge between the discharge electrodes.

SUMMARY OF THE INVENTION

It is an object of the present invention to at least partially solve the problems in the conventional technology.

An inverter device includes: multiple inverters that switch input voltages by turning on and off respective switching elements to thereby apply excitation currents to primary excitation windings of respective boosting transformers and output alternating-current voltages from secondary output windings of the respective boosting transformers, the multiple inverters having the same output characteristics, and a common control circuit, on/off control of the switching elements of the inverters being performed by the same switching signal output from the common control circuit.

An alternating-current voltage output method includes: switching input voltages by turning on and off respective switching elements using the same switching signal to thereby apply excitation currents to primary excitation windings of respective boosting transformers; and outputting alternating-current voltages from secondary output windings of the respective boosting transformers. Inverters including the respective switching elements and the respective boosting transformers have the same output characteristics.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below on the basis of accompanying drawings.

Embodiments of Plasma Generating Device

Figure 1:
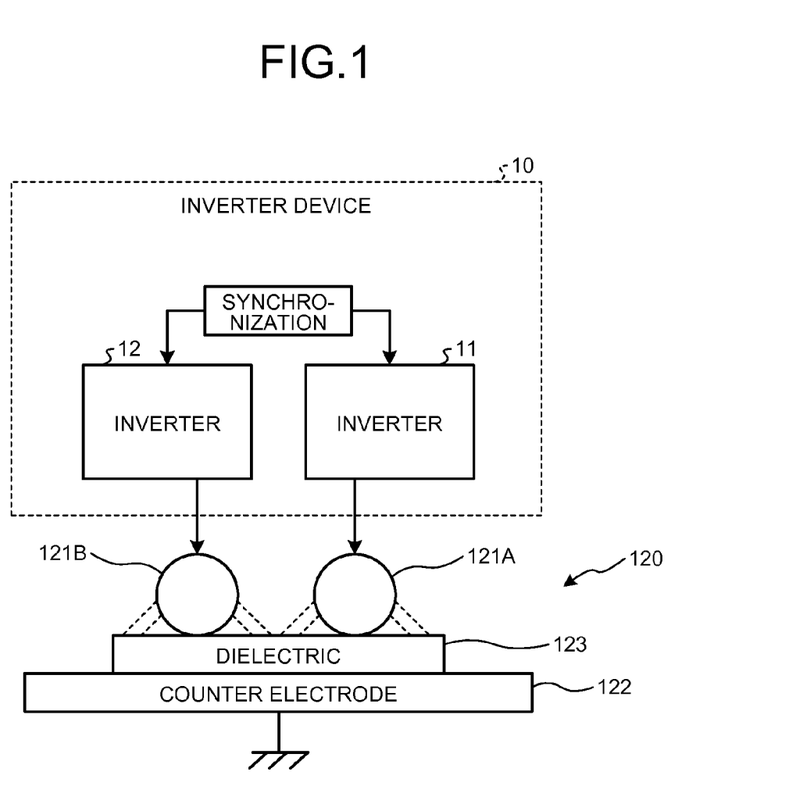
FIG. 1 is a schematic configuration diagram for explaining the basic principle of a plasma generating device according to the present invention, and corresponds to FIG. 9.

First, the basic principle of a plasma generating device according to the present invention is explained with FIG. 1. FIG. 1 is a schematic configuration diagram for explaining the basic principle of the plasma generating device according to the present invention, and corresponds to FIG. 9. A discharge unit 120, which is a load of an inverter device 10 in the plasma generating device, has the same configuration as the discharge unit 120 shown in FIG. 9.

The inverter device 10 shown in FIG. 1 includes two inverters 11 and 12 having the same output characteristics, and operates the two inverters 11 and 12 in synchronization. Then, alternating-current (AC) high voltages with the effective value of 6 KV output from the inverters 11 and 12 are separately applied to two discharge electrodes 121A and 121B of the discharge unit 120, thereby generating a plasma discharge between the discharge electrodes 121A and 121B and a counter electrode 122 through a dielectric 123. The plasma discharge in this case is a dielectric-barrier discharge.

This configuration enables power supply paths from the inverters 11 and 12 of the inverter device 10 to the discharge electrodes 121A and 121B of the discharge unit 120 to be about the same in length. Furthermore, the inverters 11 and 12 have the same output characteristics, and work in synchronization with each other; therefore, output voltage waveforms of the inverters 11 and 12 show about the same shape and amplitude and are in phase, so a phase shift (a time lag) does not occur.

Therefore, voltages applied to the discharge electrodes 121A and 121B are constantly equal, and a potential difference is not generated, so necessary high voltage can be applied to the discharge electrodes 121A and 121B without generating an unnecessary discharge between the discharge electrodes 121A and 121B.

Furthermore, there is no potential difference between the discharge electrodes 121A and 121B, so even if the distance between the discharge electrodes 121A and 121B is short, there is no possibility of the occurrence of unnecessary discharge between the electrodes; therefore, the constraint on the arrangement of the discharge electrodes can be eliminated, and the size of the device can be reduced. Furthermore, there is an advantage that management of risks of noise and electric discharge can be made easier.

A configuration of the inverters 11 and 12 included in the inverter device 10 and a means for operating the inverters 11 and 12 in synchronization will be described later. The number of inverters included in the inverter device 10 can be any number as long as it is plural, and three or more inverters may be included in the inverter device 10. The number of discharge electrodes composing the discharge unit 120 can be any number as long as it is plural, and the discharge unit 120 may be composed of three or more discharge electrodes. The inverters can separately apply output voltage to respective discharge electrode groups each composed of multiple discharge electrodes.

Figure 2:
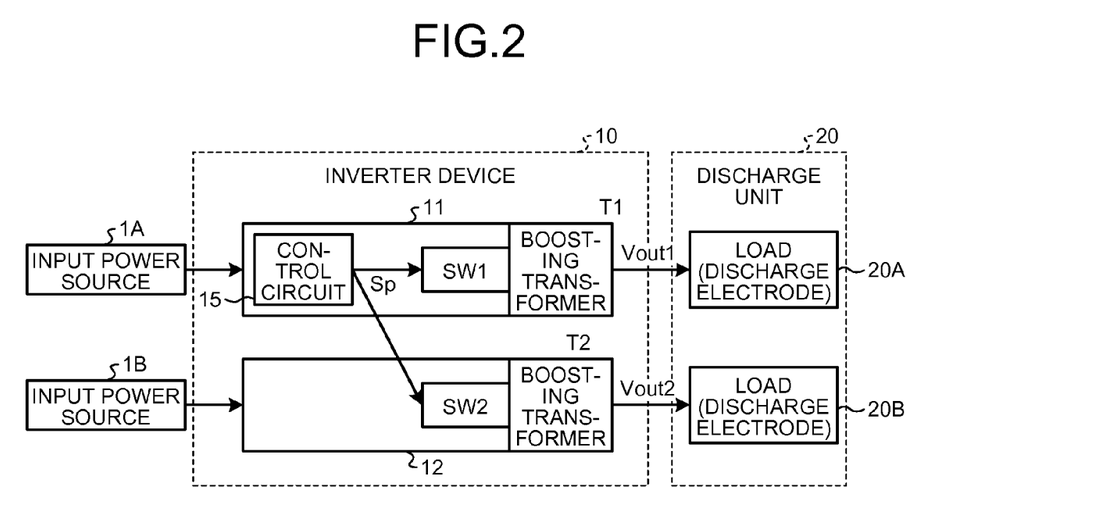
FIG. 2 is a block diagram showing a configuration of a first embodiment of a plasma generating device according to the present invention.

Subsequently, a first embodiment of a plasma generating device according to the present invention is explained with FIG. 2. FIG. 2 is a block diagram showing a configuration of the plasma generating device.

This plasma generating device is composed of the inverter device 10 and a discharge unit 20.

The inverter device 10 includes the two inverters 11 and 12. The inverter 11 includes a boosting transformer T1, a switching element SW1, and a control circuit 15. The inverter 12 includes a boosting transformer T2 and a switching element SW2, but does not include a control circuit.

An input power source 1A inputs a direct current (DC) voltage or a voltage that a pulsating current is superimposed on a DC component to the inverter 11, and the inverter 11 switches the input voltage by turning on and off the switching element SW1 to thereby apply an excitation current to a primary excitation winding of the boosting transformer T1. Accordingly, an AC voltage is output from a secondary output winding of the boosting transformer T1. On/off control of the switching element SW1 is performed by a pulsed switching signal Sp output from the control circuit 15.

An output voltage Vout1 from the inverter 11 is applied to a load 20A of the discharge unit 20. The discharge unit 20 corresponds to the discharge unit 120 in FIG. 1, and the load 20A corresponds to the discharge electrode 121A and the counter electrode 122 opposed to the discharge electrode 121A across the dielectric 123.

An input power source 1B inputs a DC voltage or a voltage that a pulsating current is superimposed on a DC component to the inverter 12, and the inverter 12 switches the input voltage by turning on and off the switching element SW2 to thereby apply an excitation current to a primary excitation winding of the boosting transformer T2. Accordingly, an AC voltage is output from a secondary output winding of the boosting transformer T1. On/off control of the switching element SW2 is performed by a pulsed switching signal Sp output from the control circuit 15 of the inverter 11.

An output voltage Vout2 from the inverter 12 is applied to a load 20B of the discharge unit 20. The load 20B corresponds to the discharge electrode 121B of the discharge unit 120 in FIG. 1 and the counter electrode 122 opposed to the discharge electrode 121B across the dielectric 123.

In this way, a plasma discharge is generated between the discharge electrodes and the counter electrode by the loads 20A and 20B of the discharge unit 20. Each of the loads 20A and 20B may have a discharge electrode group composed of multiple discharge electrodes.

The output voltages Vout1 and Vout2 from the inverters 11 and 12 of the inverter device 10 used in the plasma generating device are a high AC voltage with the effective voltage value of a few kilovolts to tens of kilovolts, and is a fast-varying voltage with the frequency of several kilohertz or more. Therefore, it is difficult for the output side to detect the voltage and perform phase control through feedback.

However, the inverters 11 and 12 of the inverter device 10 have the same output characteristics, and on/off control of the switching elements SW1 and SW2 is performed by the same switching signal Sp output from the common control circuit 15. The inverters 11 and 12 work in synchronization with each other; therefore, output voltage waveforms of the inverters 11 and 12 show about the same shape and amplitude and are in phase, so a phase shift (a time lag) does not occur. Accordingly, the same effects as the plasma generating device illustrated in FIG. 1 can be obtained.

Furthermore, one control circuit 15 is used as a control circuit for generating a switching signal, thereby an incorrect operation is less likely to occur as compared with a configuration including several control circuits. The control circuit 15 may be installed in the inverter 12, or may be installed separately from the inverters 11 and 12.

Incidentally, in FIG. 2, the input power sources 1A and 1B are provided for the inverters 11 and 12, respectively; alternatively, a single input power source may be configured to supply the same input voltage to the two inverters 11 and 12.

In this configuration, when the two inverters 11 and 12 of the inverter device 10 were operated in synchronization, an actual measured time lag between output voltages Vout1 and Vout2 was 30 nanoseconds or less.

A numerical example of a potential difference generated between the output voltages Vout1 and Vout2 in this case is explained.

Assume that output voltages Vout1 and Vout2 from the inverters 11 and 12 are both sine-wave voltage represented by Vo×sin(2πft), where Vo denotes amplitude, and f denotes frequency. Then, when frequency f is 50 kHz, and a time lag Δt between two output voltages is 30 nanoseconds, the maximum value ΔV of potential difference (corresponding to a potential difference near the phase 0 indicated by ΔV in FIG. 11) is calculated by the following equations.

$$\Delta V = Vo \cdot \sin(2\pi f \Delta t/2) \times 2$$

$$\Delta V = Vo \cdot \sin(2 \times \pi \times 50 \times 10^3 \times 30 \times 10^{-9}/2) \times 2$$

$$\Delta V \approx Vo \cdot \sin(0.009425/2) \times 2$$

$$\Delta V = Vo \cdot \sin(0.0047125) \times 2$$

$$\Delta V \approx Vo \times 0.004712 \times 2 \approx Vo \times 0.0094$$

Because an output voltage Vp-p is an amplitude Vo×2, Vo equals 10 kV when Vp-p equals 20 kV. Therefore, the maximum value ΔV of potential difference at this time is as follows.

$$\Delta V \approx 10 \times 10^3 \times 0.0094 = 94V$$

In this way, a potential difference generated between the output voltages Vout1 and Vout2 is equal to or less than 94 V, and, if there is even a slight gap between adjacent discharge electrodes, there is no possibility of the occurrence of electric discharge via the air.

Figure 3:
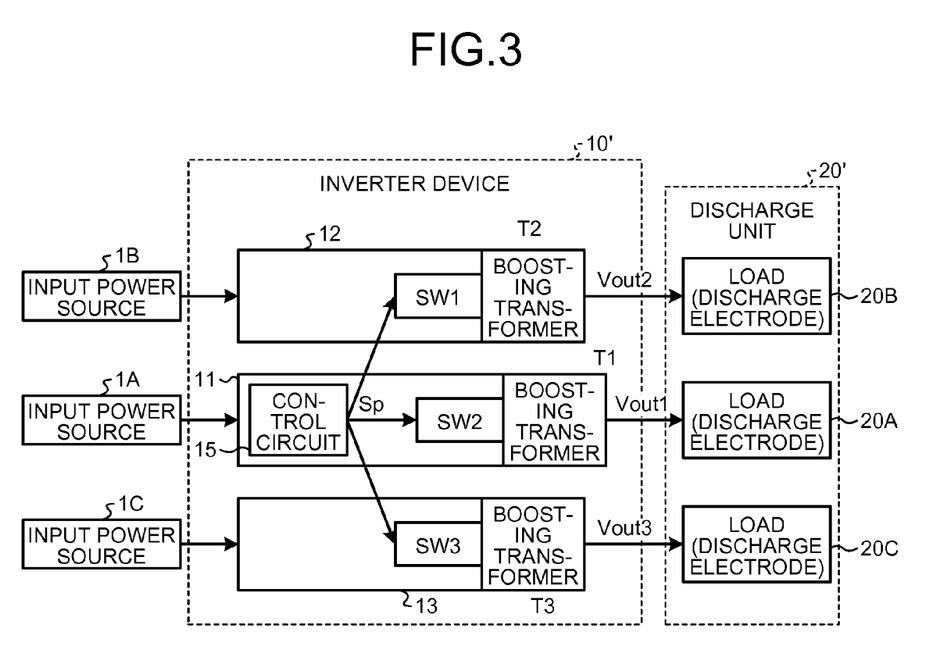
FIG. 3 is a block diagram showing a configuration of a second embodiment of a plasma generating device according to the present invention.

Subsequently, a second embodiment of a plasma generating device according to the present invention is explained with FIG. 3. FIG. 3 is a block diagram showing a configuration of the plasma generating device. A component identical to that in FIG. 2 is assigned the same reference numeral, and description of the component is omitted.

This plasma generating device is composed of an inverter device 10' and a discharge unit 20'. The inverter device 10' includes three inverters 11, 12, and 13, and the discharge unit 20' has loads 20A, 20B, and 20C including respective different electrodes at three locations.

This plasma generating device has a configuration that an input power source 1C, the inverter 13, and the load 20C are added to the first embodiment shown in FIG. 2.

The inverter 13 includes a boosting transformer T3 and a switching element SW3, but does not include a control circuit. Then, the input power source 1C inputs a DC voltage or a voltage that a pulsating current is superimposed on a DC component to the inverter 13, and the inverter 13 switches the input voltage by turning on and off the switching element SW3 to thereby apply an excitation current to a primary excitation winding of the boosting transformer T3. Accordingly, an AC voltage is output from a secondary output winding of the boosting transformer T1, an output voltage Vout3 from the inverter 13 is applied to a load 20C including a discharge electrode of the discharge unit 20', and thereby a plasma discharge is generated. On/off control of the switching element SW3 is performed by a pulsed switching signal Sp output from the control circuit 15 of the inverter 11.

In this second embodiment, the control circuit 15 is included in only the inverter 11, and on/off control of the switching elements SW1, SW2, and SW3 of the three inverters 11, 12, and 13 is synchronously performed by the same switching signal Sp output from the common control circuit 15. Furthermore, the path lengths of the switching signal Sp from the control circuit 15 to switching elements SW1, SW2, and SW3 of the respective inverters 11, 12, and 13 and the inductances of the paths are preferably set to be equal.

Accordingly, the difference in switching timing between the switching elements SW1, SW2, and SW3 can be further reduced, and the potential difference between output voltages Vout1, Vout2, and Vout3 of the inverters 11, 12, and 13 can be further reduced.

Furthermore, by arranging such that the path lengths of the switching signal Sp and the path lengths to the ground (GND) are short as much as possible, a lag or incorrect operation due to noise on the switching signal Sp can be reduced. In a device that generates an electric discharge by high-voltage output, radiation noise from a high-voltage circuit and a discharge unit or the like is prone to be severe; therefore, a switching signal and the reduction of a path to GND are of particular importance.

Incidentally, also in FIG. 3, the input power sources 1A, 1B, and 1C are provided for the inverters 11, 12, and 13, respectively; alternatively, a single input power source may be configured to supply the same input voltage to the three inverters 11, 12, and 13.

Moreover, each of the loads 20A, 20B, and 20C of the discharge unit 20' can have a discharge electrode group composed of multiple discharge electrodes.

First Embodiment of Inverter Device

Subsequently, specific embodiments of the inverter device according to the present invention are explained.

Figure 4:
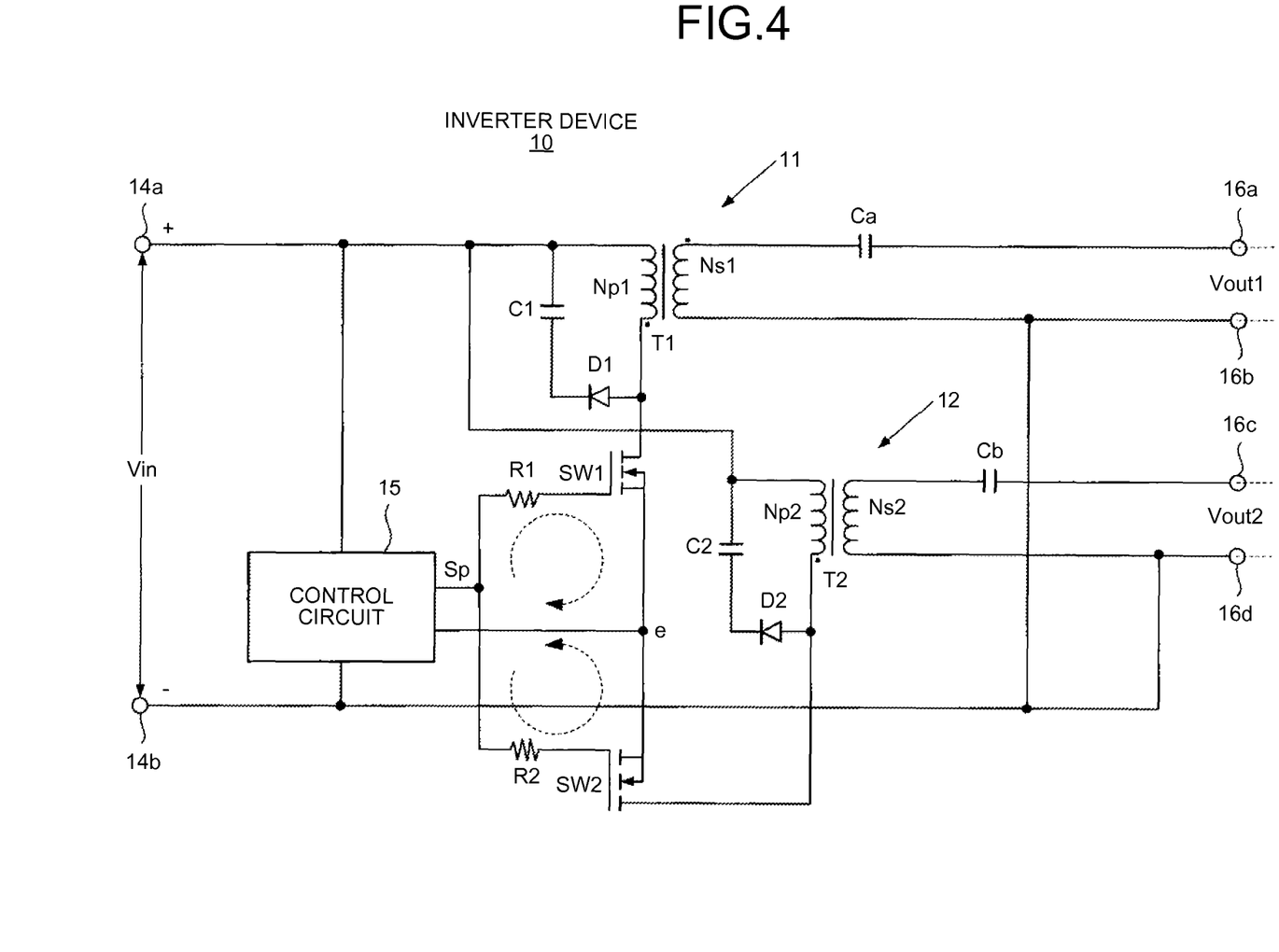
FIG. 4 is a circuit diagram showing a configuration of a first embodiment of an inverter device according to the present invention.

FIG. 4 is a circuit diagram showing a configuration of a first embodiment of an inverter device according to the present invention; this inverter device corresponds to the inverter device 10 shown in FIG. 2, so a component identical to that in FIG. 2 is assigned the same reference numeral.

This inverter device 10 is composed of the two inverters 11 and 12 and the common control circuit 15 to the inverters 11 and 12. Then, input voltage Vin supplied between input terminals 14a and 14b is applied to the inverters 11 and 12 and the control circuit 15. The input voltage Vin is a DC voltage that, for example, an AC from a commercial power supply is rectified by a full-wave rectifier circuit, and smoothed by a smoothing circuit composed of a capacitor, a resistance and/or the like, or a voltage that a pulsating current is superimposed on a DC component.

The control circuit 15 is a control IC having an oscillation circuit that generates a square-wave pulse with a frequency of about 50 kHz as a switching signal Sp.

This control circuit 15 performs pulse-width modulation (PWM) control of a switching signal Sp, and changes the ratio between ON and OFF periods in one cycle T (the duty ratio), and thereby it is also possible to control output voltages Vout1 and Vout2 of the inverters 11 and 12. The frequency and cycle of the switching signal Sp can be changed.

The inverter 11 is composed of the boosting transformer T1, the switching element SW1 and the like; the boosting transformer T1 includes an excitation winding Np1 and an output winding Ns1, and the switching element SW1 is composed of a field-effect transistor (FET) with the source-to-drain connected in series to the excitation winding Np1.

One end of the excitation winding Np1 of the boosting transformer T1 is connected to the positive input terminal 14a, and the other end is connected to a drain terminal of the switching element SW1. A source terminal of the switching element SW1 is connected to the negative input terminal 14b through the control circuit 15 from a connection point e to a source terminal of the switching element SW2.

A series circuit of a diode D1 and a capacitor C1, which composes a snubber circuit, is connected in parallel to the excitation winding Np1.

One end of the output winding Ns1 of the boosting transformer T1 is connected to an output terminal 16a through a DC-cut capacitor Ca, and the other end is connected to an output terminal 16b. The DC-cut capacitor Ca does not necessarily have to be installed.

On/off control of the switching element SW1 is performed by the application of a switching signal Sp output from the control circuit 15 to a gate terminal through a protective resistance R1.

Accordingly, the input voltage Vin is switched, and an excitation current is intermittently applied to the primary excitation winding Np1 of the boosting transformer T1. During a period in which the excitation current is applied, energy is accumulated in the boosting transformer T1; during a period in which the excitation current is off, the energy is discharged into the output winding Ns1, and an output voltage Vout1 of AC high-voltage is output.

The boosting transformer T1 is a resonance transformer that is resonated by the inductance of the output winding Ns1, stray capacitance of the secondary side and equivalent capacitance between electrodes of the discharge unit connected between the output terminals 16a and 16b, and an output voltage of the resonance transformer is proportional to sharpness of the resonance (Q value). Therefore, even if the turns ratio between the excitation winding Np1 and the output winding Ns1 is not extremely increased, a high output voltage can be obtained.

The inverter 12 is composed of the boosting transformer T2, the switching element SW2 and the like; the boosting transformer T2 includes an excitation winding Np2 and an output winding Ns2, and the switching element SW2 is composed of an FET with the source-to-drain connected in series to the excitation winding Np2.

One end of the excitation winding Np2 of the boosting transformer T2 is connected to the positive input terminal 14a, and the other end is connected to a drain terminal of the switching element SW2. The source terminal of the switching element SW2 is connected to the negative input terminal 14b through the control circuit 15 from the connection point e to the source terminal of the switching element SW1.

A series circuit of a diode D2 and a capacitor C2, which composes a snubber circuit, is connected in parallel to the excitation winding Np2.

One end of the output winding Ns2 of the boosting transformer T2 is connected to an output terminal 16c through a DC-cut capacitor Cb, and the other end is connected to an output terminal 16d. The DC-cut capacitor Cb does not necessarily have to be installed.

The output terminals 16c and 16d are connected to a ground terminal of the control circuit 15 and the negative input terminal 14b in common.

On/off control of the switching element SW2 is also performed by the application of a switching signal Sp output from the control circuit 15 to a gate terminal through a protective resistance R2.

Accordingly, the input voltage Vin is switched, and an excitation current is intermittently applied to the primary excitation winding Np2 of the boosting transformer T2. During a period in which the excitation current is applied, energy is accumulated in the boosting transformer T2; during a period in which the excitation current is off, the energy is discharged into the output winding Ns2, and an output voltage Vout2 of AC high-voltage is output.

The boosting transformer T2 is also a resonance transformer that is resonated by the inductance of the output winding Ns2, and stray capacitance of the secondary side and equivalent capacitance between electrodes of the discharge unit connected between the output terminals 16c and 16d, and an output voltage of the resonance transformer is proportional to sharpness of the resonance (Q value). Therefore, even if the turns ratio between the excitation winding Np1 and the output winding Ns1 is not extremely increased, a high output voltage can be obtained.

The boosting transformers T1 and T2 have the same characteristics, and the switching elements SW1 and SW2 have the same characteristics, and as for the other components composing the inverter 11 and the other components composing the inverter 12, those having the same characteristics are used, and the arrangement is made such that the distances of the wirings are similar as possible.

Accordingly, the inverters 11 and 12 can have the same output characteristics.

Furthermore, two loops indicated by dotted line arrows in FIG. 4, i.e., two loops, which start from a switching-signal output terminal of the control circuit 15 and pass through the switching elements SW1 and SW2 and then return to the control circuit 15 from the connection point e, are preferably set to be as similar as possible in length and be a loop as short as possible.

Accordingly, a phase shift in the switching between the switching elements SW1 and SW2 can be reduced.

In this inverter device 10, as described above, the two inverters 11 and 12 have the same output characteristics, and on/off control of the switching elements SW1 and SW2 of the inverters 11 and 12 is performed by the same switching signal Sp output from the control circuit 15.

Therefore, the two inverters 11 and 12 work in synchronization with each other, and waveforms of output voltages Vout1 and Vout2 show about the same amplitude and phase. Consequently, when the output voltages Vout1 and Vout2 are separately applied from the output terminals 16a and 16b and the output terminals 16c and 16d between different discharge electrodes and the counter electrode of the discharge unit that generates a plasma discharge, there is little potential difference between the discharge electrodes. Therefore, the same effects as the plasma generating device illustrated in FIGS. 1 and 2 can be obtained.

Second Embodiment of Inverter Device

Subsequently, a second embodiment of an inverter device according to the present invention is explained.

Figure 5:
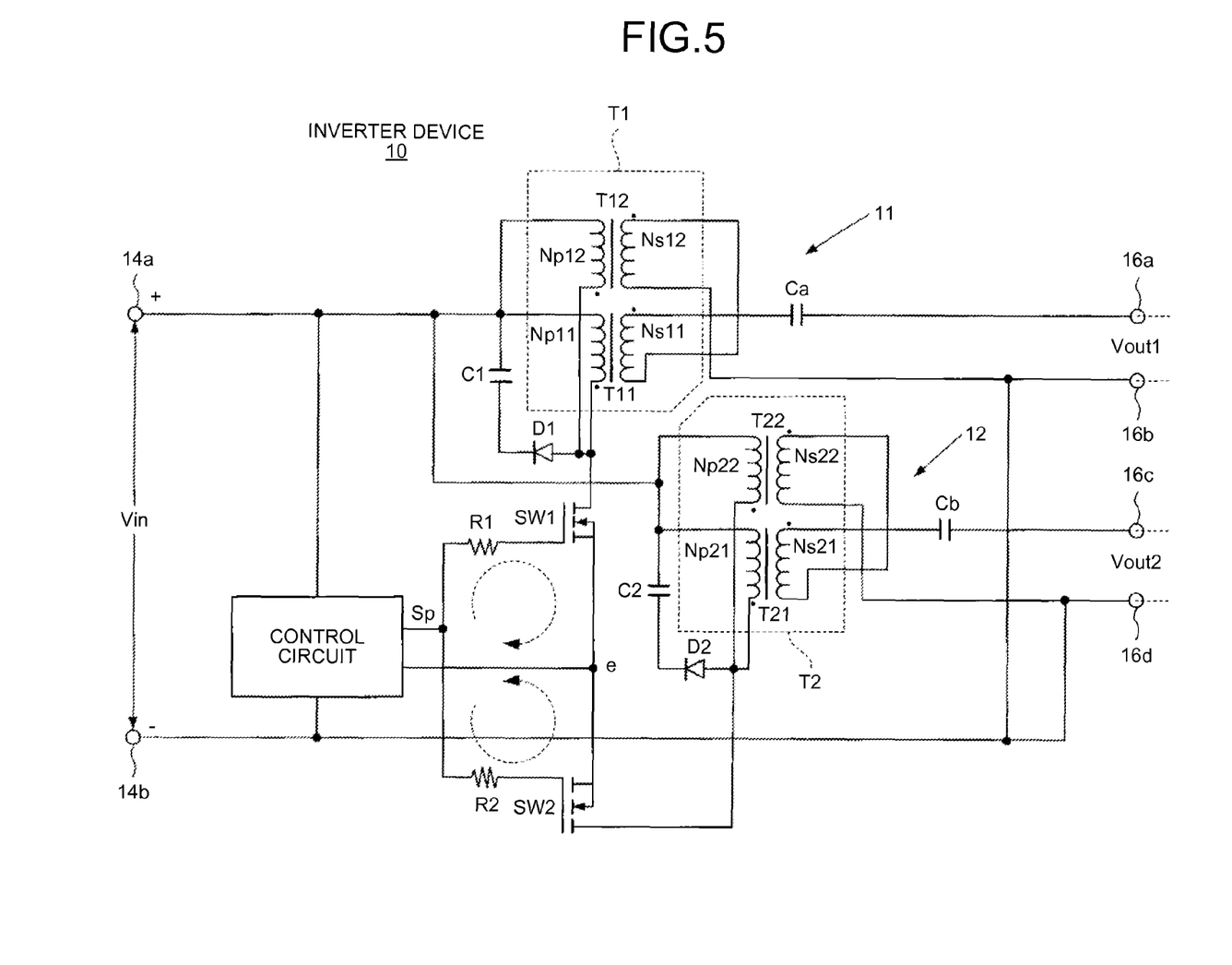
FIG. 5 is a circuit diagram showing a configuration of a second embodiment of an inverter device according to the present invention.

FIG. 5 is a circuit diagram showing a configuration of the inverter device; a component identical to that in FIG. 4 is assigned the same reference numeral. This inverter device can be also used as the inverter device 10 shown in FIG. 2.

The inverter device 10 shown in FIG. 5 according to the second embodiment differs from the inverter device 10 shown in FIG. 4 according to the first embodiment in that the boosting transformers T1 and T2 of the inverters 11 and 12 are each composed of multiple individual transformers having the same characteristics.

The boosting transformer T1 is composed of transformers T11 and T12 having the same characteristics, and excitation windings Np11 and Np12 of the transformers T11 and T12 are connected in parallel and are simultaneously excited by turning on and off the switching element SW1. Output windings Ns11 and Ns12 of the transformers T11 and T12 are connected in series; a non-connected end of the output winding Ns11 is connected to the output terminal 16a through the capacitor Ca, and a non-connected end of the output winding Ns12 is connected to the output terminal 16b.

It is preferable that the time axes of output voltage waveforms of the output windings Ns11 and Ns12 of the transformers T11 and T12 synchronize with each other. Therefore, it is preferable that the lengths of connection paths from the drain terminal of the switching element SW1 to one ends of the excitation windings Np11 and Np12 are the same.

The boosting transformer T2 is composed of transformers T21 and T22 having the same characteristics, and excitation windings Np21 and Np22 of the transformers T21 and T22 are connected in parallel and are simultaneously excited by turning on and off the switching element SW2. Output windings Ns21 and Ns22 of the transformers T21 and T22 are connected in series; a non-connected end of the output winding Ns21 is connected to the output terminal 16c through the capacitor Cb, and a non-connected end of the output winding Ns22 is connected to the output terminal 16d.

It is preferable that the time axes of output voltage waveforms of the output windings Ns21 and Ns22 of the transformers T11 and T12 synchronize with each other. Therefore, it is preferable that the lengths of connection paths from the drain terminal of the switching element SW2 to one ends of each excitation windings Np21 and Np22 are the same.

In this way, in the inverters 11 and 12, output voltages of the multiple transformers T11, T12 and T21, T22 are added in the respective boosting transformers T1 and T2, thereby high output-voltage can be easily achieved. That is, this enables high output that one transformer cannot achieve due to problems such as the occurrence of magnetic saturation, and it is possible to achieve reduction in voltage per transformer with respect to output voltage, decrease in the turns ratio, and reduction in voltage to be applied to the excitation-side switching element, and the like. Accordingly, the effect of reduction in heat loss can be obtained.

In this case, it is required that characteristics of the transformers which are simultaneously excited and outputs of which are added are the same. In this example, boosting transformers of respective inverters are each composed of two transformers having the same characteristics; alternatively, the boosting transformers can be each composed of three or more transformers having the same characteristics. However, it is necessary that all these transformers have the same characteristics, and the boosting transformers are composed of the same number of transformers.

Furthermore, excitation windings of transformers composing a boosting transformer are connected in parallel, and output windings of the transformers are connected in series, thereby the highest output voltage can be obtained; however, the connection configuration is not limited to this. If the excitation windings of the transformers are connected in series, exciting voltage per transformer can be reduced; if the output windings of the transformers are connected in parallel, output current can be increased.

Therefore, the connection of the excitation windings and output windings of the transformers may be series connection a parallel connection; however, inverters composing an inverter device have to adopt the same connection configuration.

Furthermore, the number of inverters, such as the inverters 11 and 12 composing the inverter device 10 shown in FIGS. 4 and 5, may be three as shown in FIG. 2, or may be four or more.

Configuration Example of Discharge Unit of Plasma Generating Device

Figure 6:
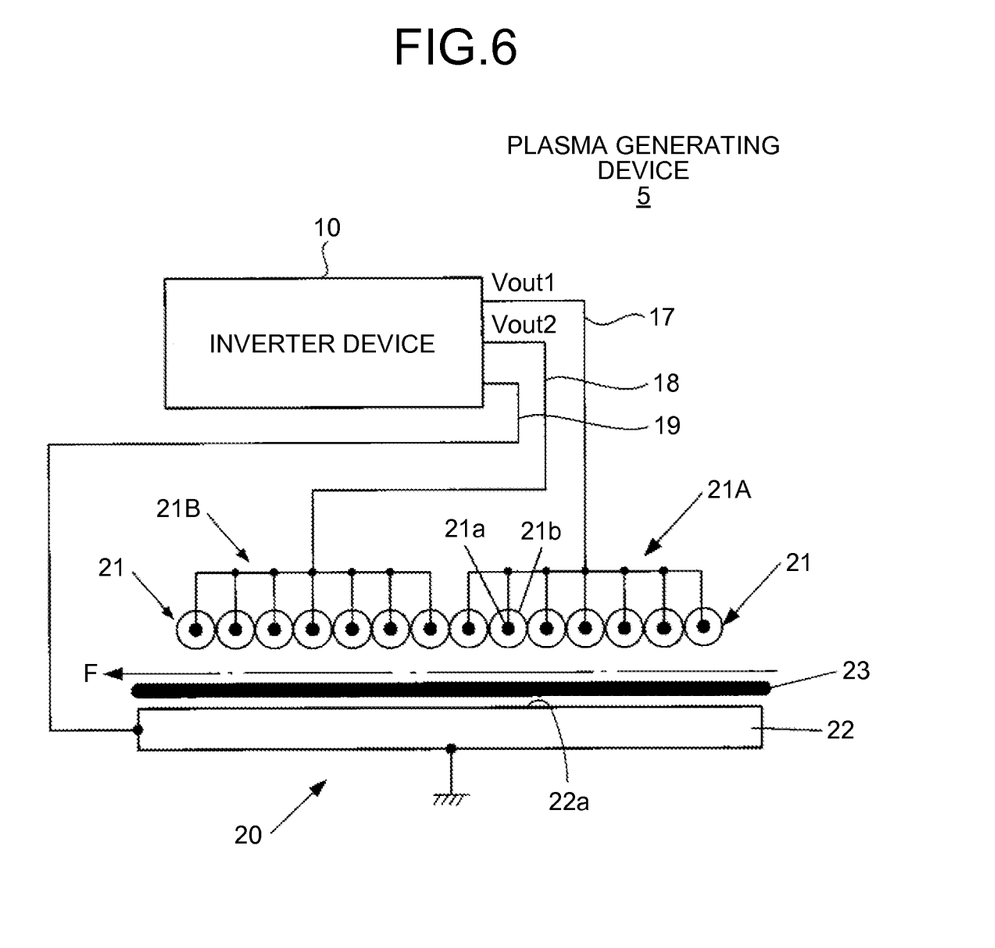
FIG. 6 is a configuration diagram showing a specific configuration of a discharge unit of the embodiment of the plasma generating device according to the present invention shown in FIG. 2.

Here, a specific configuration example of a discharge unit of a plasma generating device is explained. FIG. 6 is a configuration diagram showing a specific configuration of the discharge unit of the first embodiment of the plasma generating device according to the present invention shown in FIG. 2.

The discharge unit 20 of a plasma generating device 5 shown in FIG. 6 is composed of multiple (in this example, fourteen) discharge electrodes 21, and a counter electrode 22 opposed to the discharge electrodes 21, and a dielectric 23 which lies between the discharge electrodes 21 and the counter electrode 22.

In this example, each round bar-like discharge electrode 21 is composed of a metal wire 21a made of highly-conductive metal, such as copper or aluminum, and a dielectric (an insulator) 21b; the metal wire 21a is coated with the dielectric 21b. Two sets of seven discharge electrodes 21 compose respective discharge electrode groups 21A and 21B. Then, the discharge electrodes 21 in the discharge electrode groups 21A and 21B are arranged in a manner extending in a direction perpendicular to the plane of paper on the plane parallel to an opposed surface 22a of the flat plate-like counter electrode 22 so that the periphery of each electrode has contact with the peripheries of adjacent electrodes in crosswise direction in FIG. 6. The diameter ($\phi$) of each discharge electrode 21 is, for example, about eight millimeters.

The metal wires 21a of the discharge electrodes 21 in the discharge electrode groups 21A and 21B are connected to one another so as to conduct electricity.

The counter electrode 22 is a flat plate-like electrode made of highly-conductive metal, such as copper or aluminum, and also serves as a radiator plate. The dielectric 23, such as a silicon-based sheet, is deposited on the opposed surface 22a of the counter electrode 22 opposed to the discharge electrodes 21. In FIG. 6, for the sake of simplicity, there is provided a gap between the counter electrode 22 and the discharge electrodes 21; however, actually, the counter electrode 22 and the discharge electrodes 21 are stuck together with glue or the like.

Furthermore, there is provided a wide gap between the discharge electrodes 21 and the dielectric 23 in FIG. 6; however, actually, it is only necessary to provide a certain degree of gap that allows a sheet member such as a printing sheet to be subjected to surface reforming to pass through as indicated by an alternate long and short dash line arrow F.

Output voltages Vout1 and Vout2 with the effective value of 6 KV or more from the inverters 11 and 12 of the inverter device 10 are separately applied between the discharge electrode groups 21A and 21B and the counter electrode 22 of the discharge unit 20 configured as above through power supply lines 17 to 19.

The output terminals 16b and 16d of the inverter device 10 shown in FIG. 4 or 5 are connected in common, and therefore are connected to the counter electrode 22 by the common power supply line 19, and the counter electrode 22 is grounded.

Accordingly, in the atmospheric pressure between the discharge electrodes 21 and the counter electrode 22, any of a creeping discharge, a silent discharge, and a dielectric-barrier discharge by a combined discharge of creeping discharge and silent discharge, which are kinds of atmospheric-pressure plasma discharge, can be generated. Even when the voltage applied to the discharge electrodes 21 is inverted, there are no differences in function effects.

The plasma generating device 5 separately applies the output voltages Vout1 and Vout2 from the inverters of the inverter device 10 to the discharge electrode groups 21A and 21B of the discharge unit 20, and therefore can increase the discharge area obtained by combining the discharge electrodes 21 in the two discharge electrode groups 21A and 21B. However, the number of discharge electrodes, which apply output voltage, in each inverter of the inverter device 10 is reduced; therefore, the difference between lengths of power supply lines from an output terminal of each inverter to the discharge electrodes 21 is reduced, and the time lag of applied voltage is reduced.

Furthermore, the inverters composing the inverter device 10 have the same output characteristics and work in synchronization; therefore, waveforms of the output voltages Vout1 and Vout2 show the same shape and amplitude and are in phase. Therefore, voltages applied to the discharge electrode groups 21A and 21B are constantly equal, and the distribution of voltage between the discharge electrodes 21 and the counter electrode 22 is roughly even. That is, variation in voltage when the discharge unit 20 which is a load is seen as a whole is suppressed, and there are no generation of an electric discharge between discharge electrodes and no occurrence of unevenness of a plasma discharge.

If the number of discharge electrode groups is increased according to the size and number of discharge electrodes, and the number of inverters composing an inverter device is increased according to the number of discharge electrode groups, it is possible to support a discharge unit having the larger discharge area.

A sheet member is conveyed through this discharge unit 20 as indicated by the alternate long and short dash line arrow F, thereby the surface of the sheet member comes in contact with active species such as radicals or ions generated by the dielectric-barrier discharge, and the reforming progresses. The reforming progresses because various groups, such as a hydrophilic functional group, formed by components in the air and components contained in the sheet member are formed on the surface of the sheet member by the plasma and the surface energy is increased.

The configuration of the discharge unit of the plasma generating device according to the present invention is not limited to the above-described configuration, and various modifications can be made. Furthermore, the discharge unit of the plasma generating device can be applied to a device that generates plasma by a corona discharge and a device that generates a plasma discharge in a low-pressure ambience containing some gas.

Embodiment of Sheet-member Reforming Device

Figure 7:
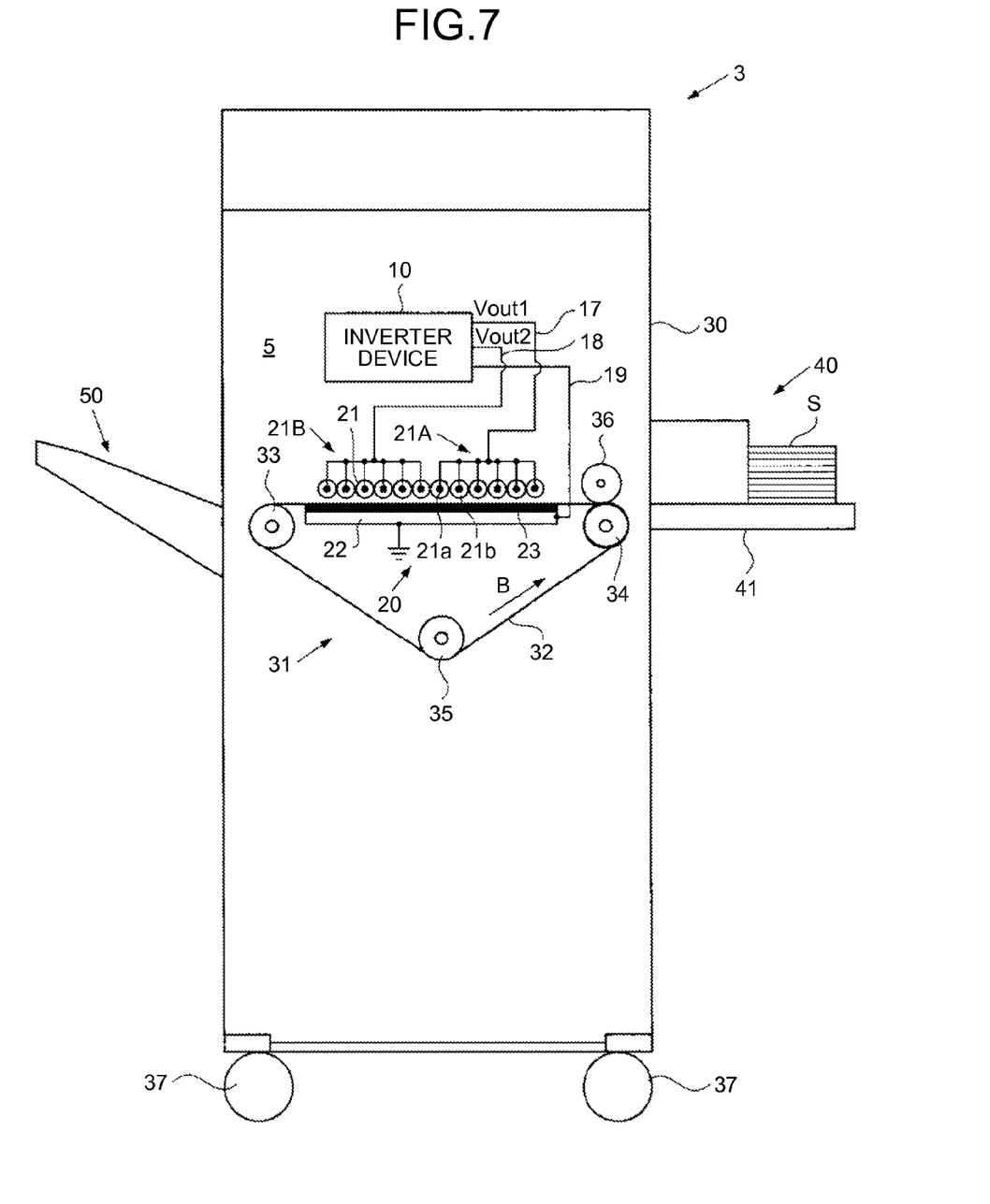
FIG. 7 is a schematic configuration diagram showing one embodiment of a sheet-member reforming device according to the present invention.

Subsequently, an embodiment of a sheet-member reforming device according to the present invention is explained with FIG. 7. FIG. 7 is a schematic configuration diagram of a stand-alone sheet-member reforming device according to one embodiment of the present invention.

This sheet-member reforming device 3 is a device for reforming the surface of sheet members, such as plain paper generally used in copying, printing and the like, coated paper, a resin film including a viewgraph, cardboard such as a card and a postcard, and an envelope. As the reforming, hydrophilization of the surface of a sheet member, improvement of acidity, or improvement of permeability, and the like can be performed.

The sheet-member reforming device 3 shown in FIG. 7 includes, as a reforming unit for performing the above-described reforming, the plasma generating device 5 illustrated in FIG. 6 and a sheet-member conveying device 31 in a main body 30 thereof.

The plasma generating device 5 is, as described above, composed of the inverter device 10 and the discharge unit 20; the discharge unit 20 includes discharge electrode groups 20A and 20B each composed of the multiple discharge electrodes 21, the counter electrode 22, and the dielectric 23. The dielectric 23 is deposited on the surface of the counter electrode 22 opposed to the discharge electrode groups 20A and 20B.

Then, the ground-side power supply line 19 of the inverter device 10 is connected to the grounded counter electrode 22, and the high-voltage-side power supply lines 17 and 18 are connected to the discharge electrode groups 20A and 20B, respectively, and further connected to the metal wires 21a of the discharge electrodes 21 in the discharge electrode groups 20A and 20B. Accordingly, AC output voltages Vout1 and Vout2 of a dozen kilovolts from the inverters of the inverter device 10 are applied between the discharge electrodes 21 of the discharge electrode groups 20A and 20B and the counter electrode 22, respectively, and a dielectric-barrier discharge is generated.

The sheet-member conveying device 31 includes a conveyance belt 32, a drive roller 33, a driven roller 34, a tension roller 35, and a pinch roller 36. The conveyance belt 32 is made of insulating material, such as polyimide. The drive roller 33, the driven roller 34, and the tension roller 35 support the conveyance belt 32 so that the conveyance belt 32 can move along the roughly-horizontal surface of the dielectric 23. The pinch roller 36 is opposed to the driven roller 34.

The drive roller 33 is driven to rotate by a motor (not shown), thereby causing the conveyance belt 32 to circulate (rotate). The conveyance belt 32 has the width (dimension in the direction perpendicular to the plane of paper of FIG. 7) larger than the maximum width of sheet members to be reformed.

The discharge electrodes 21 of the discharge unit 20 having the same roller-like shape are arranged between the drive roller 33 and the driven roller 34 along a moving direction of the roughly-horizontal part of the conveyance belt 32, and extend in the width direction of the conveyance belt 32.

At one of the side surfaces of the main body 30, a sheet-member feeding unit 40 for supplying a sheet member S toward the reforming unit in the main body 30 is installed; at the other side surface, a sheet-member stack unit 50 onto which a reformed sheet member is discharged and stacked is installed. Furthermore, on top of the main body 30, an operation panel including various operation switches and a display is installed, but is not shown in FIG. 7.

Casters 37 are attached to the bottom of the main body 30 so that the sheet-member reforming device 3 can be easily moved and can be used together with an image forming apparatus or the like.

According to the sheet-member reforming device 3 configured as above, in the main body 30, when the plasma generating device 5 in the reforming unit has started, the inverter device 10 applies high voltage between the discharge electrodes 21 and the counter electrode 22 of the discharge unit 20. Accordingly, a dielectric-barrier discharge is generated between the discharge electrodes 21 and the counter electrode 22, and plasma is formed toward the counter electrode 22. In this case, besides the dielectric 23, the insulators 21b of the discharge electrodes 21 and the conveyance belt 32 also compose a dielectric between the metal wires 21a of the discharge electrodes 21 and the counter electrode 22. Therefore, depending on the circumstances, the dielectric 23 deposited on the surface of the counter electrode 22 may be omitted.

Then, the sheet-member feeding unit 40 sequentially feeds sheet members S stacked on a tray 41 into the reforming unit in the main body 30 one by one. The fed sheet member S is held between the driven roller 34 and the pinch roller 36 and conveyed onto the conveyance belt 32, and the sheet member S on the conveyance belt 32 is conveyed to the left in FIG. 7 through the gap between the discharge electrodes 21 and the dielectric 23.

While the sheet member S is being conveyed, the surface of the sheet member has contact with the plasma formed by the dielectric-barrier discharge, and the reforming progresses. The reforming progresses because various groups, such as a hydrophilic functional group, formed by components in the air and components contained in the sheet member are formed on the surface of the sheet member by the plasma and the surface energy is increased. For example, when the surface of the sheet member has a water-shedding portion, the surface of the sheet member is reformed by hydrophilizing the portion.

In an area where the sheet member S exists in the discharge unit 20, plasma caused by a creeping discharge is generated along the surface of the sheet member S; therefore, the reforming is effectively performed.

The sheet member on which the surface reforming process has been performed by the reforming unit is discharged from the main body 30 and stacked on the sheet-member stack unit 50.

The many discharge electrodes 21 are arranged along the moving direction of the conveyance belt 32, and as described above, the distribution of voltage between the discharge electrodes 21 and the counter electrode 22 is roughly even. Furthermore, the discharge electrodes 21 are formed into a round bar in which the metal wire 21a is coated with the insulator 21b; therefore, it is possible to avoid the concentration of discharges, and uniform reforming can be performed entirely.

If the discharge electrodes 21 are movably supported so that the discharge electrodes 21 can move in accordance with the movement of a sheet member, or if the discharge electrodes 21 are movably supported so that the discharge electrodes 21 can make an up-and-down motion, and downward pressing force is applied to the discharge electrodes 21 to bring the discharge electrodes 21 into contact with the surface of the sheet member constantly, the uniformity can be further improved, and it is possible to suppress energy loss.

If a sheet member with hydrophilicity increased by a reforming process is used as a printing sheet for, for example, an ink-jet image forming apparatus, the adherability of ink droplets is improved, and therefore, the image quality is also improved, and the ink drying time can be shortened, so that the need for drying by heating can be eliminated. Furthermore, automatic duplex printing can be performed quickly.

Moreover, if the hydrophilicity of a sheet member on which an image has been formed by an electrophotographic image forming apparatus is increased by a reforming process, and then post-processing of application of coating agent, such as varnish, is performed on the sheet member, the coating agent can be uniformly applied to the whole surface of the sheet member. Accordingly, the surface of the sheet member on which the image has been formed can be easily protected and burnished, resulting in an increase in added value.

Furthermore, needless to say, modifications or additions can be arbitrarily made on the configuration examples, operation examples, variations, and the like of the embodiments described above, or part of these can be deleted, and the embodiments can be arbitrarily combined as long as mutual inconsistency is not caused.

An inverter device according to an embodiment can apply necessary high voltage to multiple discharge electrodes without generating an unnecessary discharge between the discharge electrodes which are loads. Therefore, for example, the discharge area of a plasma generating device can be increased, and the surface reforming ability of the plasma generating device can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter device comprising:
   multiple inverters that switch input voltages by turning on and off respective switching elements to thereby apply excitation currents to primary excitation windings of respective boosting transformers and output alternating current voltages from secondary output windings of the respective boosting transformers, the multiple inverters having the same output characteristics, and
   a common control circuit, on/off control of the switching elements of the inverters being performed by the same switching signal output from the common control circuit wherein,
   lengths of paths of the switching signal from the control circuit to the switching elements of the respective inverters and inductances of the paths are equal to one another.

2. The inverter device according to claim 1, wherein boosting transformers of the multiple inverters are each composed of multiple transformers having the same characteristics, and
   excitation windings of the multiple transformers composing each boosting transformer of each inverter are connected in parallel or in series so that the excitation windings are simultaneously excited, and output windings of the multiple transformers are connected in parallel or in series.

3. The inverter device according to claim 2, wherein the time axes of output voltage waveforms of the output windings of the multiple transformers composing each boosting transformer of each inverter synchronize with one another.

4. The inverter device according to claim 1, wherein the boosting transformer of each inverter is a resonance transformer with an output voltage proportional to sharpness of resonance.

5. A plasma generating device comprising:
the inverter device according to claim 1; and
a discharge unit including multiple discharge electrodes and a counter electrode, any one of synchronized alternating-current voltages output from the respective inverters of the inverter device being applied to each of the multiple discharge electrodes, wherein
a plasma discharge is generated between the discharge electrodes and the counter electrode.

6. A sheet-member reforming device comprising the plasma generating device according to claim 5, wherein the sheet-member reforming device conveys a sheet member through a gap between the discharge electrodes and the counter electrode of the plasma generating device, and reforms the sheet member by the plasma discharge.

7. An alternating-current voltage output method comprising:
switching input voltages by turning on and off respective switching elements using the same switching signal to thereby apply excitation currents to primary excitation windings of respective boosting transformers; and
outputting alternating-current voltages from secondary output windings of the respective boosting transformers, wherein
inverters including the respective switching elements and the respective boosting transformers have the same output characteristics and wherein,
lengths of paths of the same switching signal to the switching elements of the respective inverters and inductances of the paths are equal to one another.

* * * * *